United States Patent [19]

Cook et al.

[11] Patent Number: 5,068,750
[45] Date of Patent: Nov. 26, 1991

[54] CONTAMINANT REMOVAL FROM TELESCOPE OPTICAL ELEMENTS

[75] Inventors: Lacy G. Cook, El Segundo; Bryce A. Wheeler, Mammoth Lakes, both of Calif.

[73] Assignee: Hughes Aircraft Company, Los Angeles, Calif.

[21] Appl. No.: 600,956

[22] Filed: Oct. 22, 1990

[51] Int. Cl.[5] .......................... G02B 23/00; B08B 7/00
[52] U.S. Cl. ...................................... 359/399; 359/507; 134/1
[58] Field of Search ...................... 350/537, 582; 134/1

[56] References Cited

U.S. PATENT DOCUMENTS

| 4,756,765 | 7/1988 | Woodraffe | 134/1 |
| 4,920,994 | 5/1990 | Nachbar | 134/1 |

FOREIGN PATENT DOCUMENTS 2709725 9/1978 Fed. Rep. of Germany .......... 134/1

*Primary Examiner*—Jon W. Henry
*Attorney, Agent, or Firm*—William J. Streeter; Wanda K. Denson-Low

[57] ABSTRACT

Illumination, heating and/or damage to baffles (114) and other structures (112) of a telescope (110) during cleaning of its mirrors (116, 118) by a laser beam (128) is avoided by directing the laser beam from a source (130) outside of the telescope through its entrance aperture (126) and to a reflector (146). The reflector is secured to an already existing telescope shutter (120) so that the beam can be directed on a return path back from the reflector through the entrance aperture and to the outside of the telescope. Preferably, the cleaning occurs by a Nd:GSGG (neodymium and chromium doped gallium garnet crystal) laser (130) after reflection from the reflector. Cleaning is also obtainable by a laser beam generated by a carbon dioxide laser prior to reflection from the reflector.

20 Claims, 2 Drawing Sheets

CONTAMINANT REMOVAL FROM TELESCOPE OPTICAL ELEMENTS

BACKGROUND OF THE INVENTION

The present invention relates to an improved method and apparatus for cleaning optical elements in telescopes using a laser beam and, in particular, to such cleaning without illumination or heating of, or damage to the baffles and other structures of the telescope.

Telescopes, operating for example at cryogenic temperatures, are subject to the deposition of such contaminant films as water, carbon dioxide, nitrogen and organic materials on various mirror and other optical surfaces. These contaminant films degrade the performance of the telescope, and techniques involving the use of laser beams have been shown to remove such films, see for example, "Contaminant Removal off Optical Surfaces in Space," L. G. Piper et al, SPIE Vol. 777, 1987, pages 320-332.

Such techniques for removing contaminants utilize relatively large sized, heat dissipating equipment, including laser sources, power supplies, electronics and scan mirrors, all or many of which are placed inside the cryogenic telescope housing. While the large size of such equipment in itself is a disadvantage, primarily as taking up valuable space within the telescope and requiring the telescope to be modified for incorporation of such equipment and possibly obstructing the passage of radiation through the telescope, other more serious problems arise. For example, some portions of certain mirrors may not be covered and cleaned by the laser beam, because limitations as to the number and placement of laser sources do not always allow a direct path to each mirror, and indirect paths by means of reflection from other telescope mirrors may not be along paths for which the mirrors were designed and sized. Further, the cleaning beam and its reflections cannot be fully controlled, and such uncontrolled beam reflections impact onto the telescope structure or its baffles where heating and damage often occurs.

SUMMARY OF THE INVENTION

These and other considerations are successfully addressed in the present invention by placing a reflecting mirror adjacent to or on the existing field stop/shutter assembly in the telescope, a laser beam source outside of the telescope, and a scanner positionable at the telescope entrance aperture for enabling the laser beam to be inserted into the telescope. The reflecting mirror is approximately the same size as the field stop of the telescope, and is located generally at the intermediate image of the telescope. The reflecting mirror is used to reflect the beam in a generally backwards manner along its incident direction. Such backwards reflection includes retro-reflection where the beam precisely retraces its incoming path.

When it is desired to clean the primary and secondary mirrors or other optical elements associated with the telescope, the shutter with its associated reflecting shutter mirror is closed and the scanner is positioned at the telescope entrance aperture. The scanner then moves the laser beam through small angles which are equal to the telescope field of view. The beam, whose diameter is relatively small, makes only small motions on the primary and secondary mirrors as it travels to the shutter mirror. Upon reflection from the shutter mirror on its return path out of the telescope, the beam covers and cleans the entire primary and secondary mirrors and/or other optical elements. The laser beam is at all times controlled and confined to the mirror surfaces, and safely exits the telescope after the cleaning process without illuminating the telescope baffles or structure. Alternately, the cleaning can be effected along the reverse of the path described above as the beam enters the telescope, prior to its reflection back out of the telescope by means of the shutter mirror.

Several advantages are derived from this arrangement. The laser and its associated power supply, electronics and scanner are outside the telescope and, therefore, do not interfere with the operation of the telescope. The entire surfaces of all mirrors preceding the telescope intermediate image can be covered and cleaned. The laser beam is completely controlled at all times and safely exits from the telescope after its cleaning operation, thus preventing illumination or heating of, or damage to the telescope's structure and baffles otherwise resulting from unwanted or uncontrolled reflections inside of the telescope.

Other aims and advantages, as well as a more complete understanding of the present invention, will appear from the following explanation of exemplary embodiments and the accompanying drawings thereof.

DETAILED DESCRIPTION OF THE PREFERRED EMBODIMENTS

Figure 1:
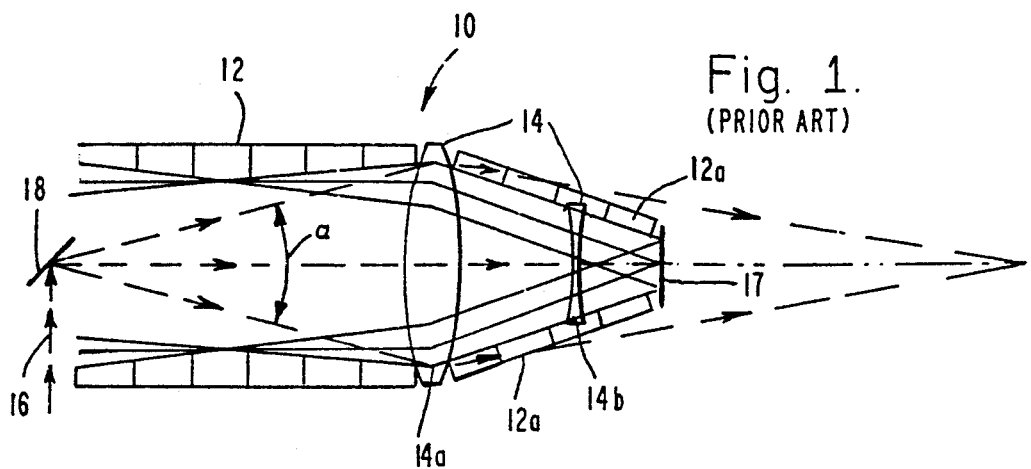
FIG. 1 illustrates a prior art technique using a laser beam for removing contaminants from optical elements in a telescope.

Accordingly, FIG. 1 depicts a prior art arrangement for cleaning a telescope 10 having baffles 12 and optical elements 14, in which cleaning of optical elements 14 is effected by removing contaminants with a laser beam 16. The first two optical elements of the telescope are shown as refractive lenses 14a and 14b, but it is to be understood that they could equally well be reflective mirrors. In this prior art cleaning arrangement, laser beam 16 is introduced into the telescope aperture by a reflective scanner element 18 and scanned through large angles $\alpha$ to directly cover and clean, in this illustration, first optical element 14a. Portions of beam 16 are reflected from a mirror 17 but, as can be seen from the figure, a significant portion of the laser energy is immediately or eventually incident on telescope baffles 12, specifically on baffle portions 12a, where heating and damage can occur. This highly undesirable consequence results from the method of beam insertion, the large angle scan of the beam through angle $\alpha$, and the imaging properties of the telescope optical elements.

Figure 2:
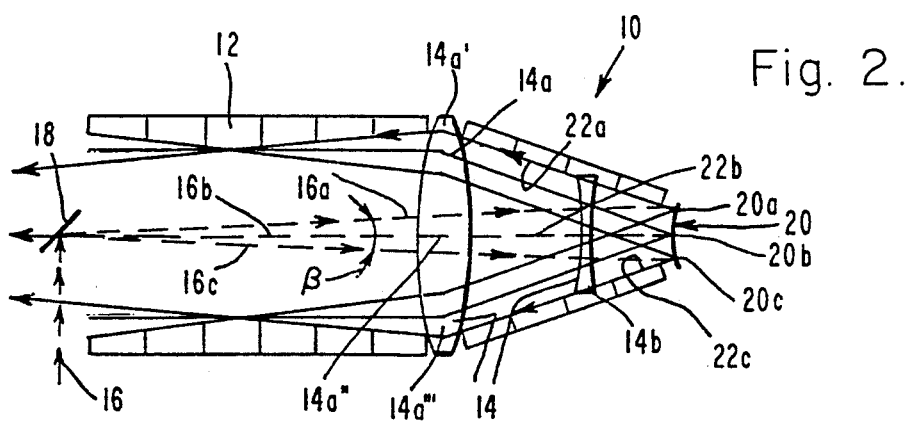
FIG. 2 depicts the essential features of the preferred embodiment of the present invention in which the cleaning occurs on the return or exit path of the laser beam after its reflection from the optical elements.

FIG. 2 depicts the essential features of the preferred embodiment of the present invention using the same refractive analog telescope 10 as is used in FIG. 1. Laser beam 16 is reflected from scanning element 18 and is thereby injected at a point in the entrance aperture of the telescope baffle tube 12, but is scanned over a narrow range of angles β equal to the telescope field of view. Beam 16 is reflected from a reflective element 20 back out of telescope 10. Element 20 is preferably placed on or adjacent to the telescope field stop/shutter. As a consequence, the beam covers only small portions of first and second telescope optical elements 14a and 14b on the initial pass through the optics.

In FIG. 2, reflecting shutter mirror 20 is located at or near the telescope intermediate image and is sized to be approximately equal to the size of the telescope field stop. The specific characteristics of shutter mirror 20, such as location, tilt and power, are dependent on the optical characteristics of the telescope, but in basic operation the shutter mirror distributes the incident scanned laser beam in such a manner as to cover and clean all portions of the telescope optics on the return path of the laser beam prior to its exiting safely from the telescope. It is an important aspect of the present invention that, at all times, laser beam 16 is confined to the telescope optical elements along the same ray paths that are used when the telescope is used for viewing a scene.

From FIG. 2, a cooperative or interrelated optical and mechanical arrangement by which the invention can be carried out, it can therefore be seen that, when the beam is scanned along path 16a to the top of the telescope field of view, beam 16 is incident on the top 20a of shutter mirror 20, is reflected along the top 22a of the imaging F-cone, and cleans the top 14a' of the telescope optics. As beam 16 is scanned to the center of the telescope field of view, along path 16b, the beam is incident on the center 20b of the shutter mirror, is retro-reflected nearly along the center 22b of the imaging F-cone, and cleans the center 14a" of the telescope optics. As the beam is scanned to the bottom of the telescope field of view along path 16c, the beam is incident on the bottom 20c of the shutter mirror, is reflected along the bottom 22c of the imaging F-cone, and cleans the bottom 14a''' of the telescope optics. The aforementioned retro-reflected condition can be utilized to obtain a line-of-sight or boresight reference signal.

Figure 3:
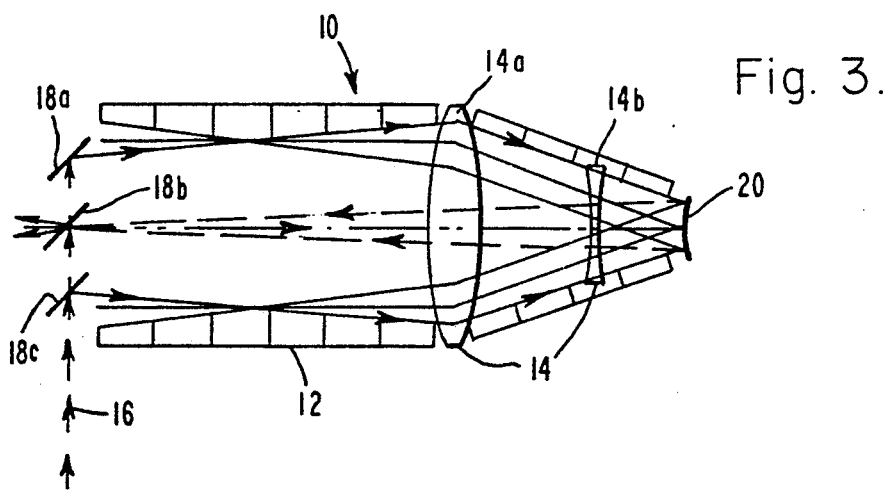
FIG. 3 shows another embodiment of the present invention in which the cleaning is effected on the initial pass of the laser beam into the telescope in a direction that is the reverse of the ray paths indicated in FIG. 2.

FIG. 3 depicts another embodiment of the present invention where cleaning is accomplished on the initial pass into telescope 10 along the reverse of ray paths 16a, 16b and 16c shown in FIG. 2. In order to clean the telescope optics in the manner shown in FIG. 3, the scanning mechanism must employ lateral translation as well as tilting to cover the entire telescope aperture. Thus, indicia 18a, 18b and 18c define three sequential positions of the same reflector in order to illustrate the necessary combined translation and tilting functions of the reflector.

Figure 4:
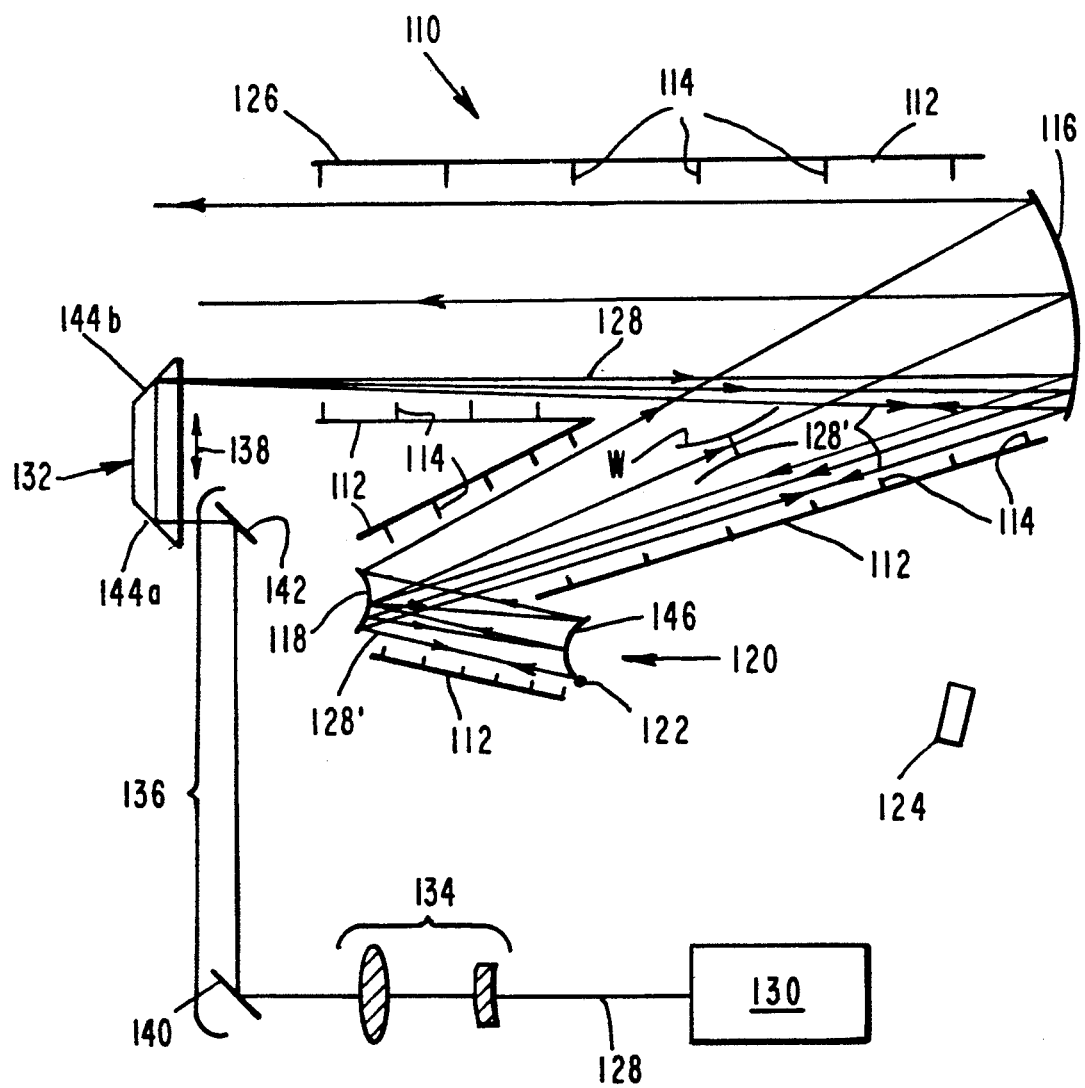
FIG. 4 is a view of the preferred embodiment of the present invention, which comprises a similar but more detailed arrangement as that shown in FIG. 2 and in which the FIG. 2 refractive lenses have been replaced by reflective mirrors.

As stated above, FIG. 4 is a view of the preferred embodiment of the present invention similar to that shown in FIG. 2, in which the refractive lenses of FIG. 2 have been replaced by reflective mirrors, and in which various additional details not previously illustrated are included.

Specifically, as shown in FIG. 4, a telescope 110 of conventional construction includes a structure 112, baffles 114, a primary mirror 116, a secondary mirror 118 and a shutter 120. Shutter 120 is pivotable or swivellable about a pivot or swivel point 122. Optically in line and spaced from shutter 120 are subsequent optics and a sensor array 124. Telescope 110 has an entrance aperture 126 which is directed to a scene or field of regard to be viewed.

As is conventional, when the telescope is not in use for its intended viewing function, shutter 120 is closed to prevent any undesired electromagnetic energy from being directed onto optics and sensor array 124 and, therefore, to prevent damage thereto. When telescope 120 is to be used for purposes of viewing a scene, shutter 122 is pivoted or swivelled about point 122 to permit radiation from the object being observed to enter the telescope through entrance aperture 126 and to be reflected from primary mirror 116 and secondary mirror 118 onto the subsequent optics and sensor array 124.

While the illustrated configuration is conventional, there are other telescope configurations other than the illustrated primary and secondary mirrors 116 and 118 in which other reflective and refractive optical elements are used.

The ability of the telescope to accurately acquire information from the object or scene being viewed is dependent upon the optical cleanliness of the various optical elements such as primary and secondary mirrors 116 and 118. As previously stated, deposition of such films as water, carbon dioxide, nitrogen and organic materials on the surfaces of mirrors 116 and 118 degrade performance of the telescope. These contaminant films can be removed by use of laser beams, and the present invention also utilizes such laser beam cleaning techniques, but in a novel manner.

In general, a laser beam 128 is generated by a laser source 130, which is positioned outside of telescope 110, and is directed into telescope aperture 126 by a movable device 132, embodied as a folding prism incorporated in a roof arrangement. Source 130 is of conventional design, and may comprise any laser of suitable configuration. For use in the present invention, the preferred sources are an Nd:GSGG (neodymium and chromium doped gallium garnet crystal) laser and a carbon dioxide laser. Specifically, laser beam 128 is directed through optical elements including a beam expander 134, a 2-axis scan mechanism 136, and prism 132. Prism 132 is movable in a lateral fashion towards and away from telescope entrance aperture 126, as denoted by double-headed arrow 138, respectively during times of telescope cleaning and viewing. Mechanism 136 is of conventional construction and comprises a pair of reflective elements 140 and 142, which are rotatable orthogonally with respect to one another so that beam 128 may be moved angularly in two dimensions. Beam 128 is directed from reflective element 142 to reflecting side 144a of prism 132. During use of the invention for cleaning optical elements, one reflecting side 144b of prism 132 positioned at entry 126 of telescope 110.

A mirror surface 146, facing secondary mirror 118, is placed on or adjacent to shutter 120 and is disposed to swivel or pivot along with the shutter about point 122. The specific optical surface placement of mirror 146 is determined in combination with a scanning geometry that ensures essentially full rejection of the laser energy from the telescope. Attachment of mirror 146 to shutter 120 is the least intrusive method.

In operation, beam 128 from laser 130 is magnified by beam expander 134 and then angularly deflected by reflective elements 140 and 142 of 2-axis scanning system 136 in two orthoginal directions before being relayed into telescope entrance aperture 126 by prism 132, which has been deployed into the position shown in the drawing. The cleaning sequence is designed to ensure that the mirrors can be cleaned under all conditions, even when the contaminant films are very thick. Beam expander 134 has a variable focus mechanism which allows the laser beam to be brought to a focus on all of the optical surfaces in the optical path.

The mirror cleaning sequence is initiated when power is applied to the system, for example, 28 volts. After a power-up and self-test sequence is performed by the control electronics, prism 132 is deployed into the telescope entrance pupil, a position sensor on the prism indicating whether deployment is successful. If so, the actual cleaning sequence is initiated. The order in which the individual mirrors are cleaned can be altered to any given situation by making use of the variable focus capability of beam expander 134, which allows the laser beam focus or waist to be located at any position along the beam path. For example, the secondary mirror can be cleaned first on the outgoing pass, as in the preferred embodiment, by locating the laser focus or waist directly on that surface, followed by cleaning of the primary mirror (on the outgoing pass) by a similar location of the laser focus or waist on that surface. Alternatively, in some situations, the primary and secondary mirrors can be cleaned simultaneously on the outgoing pass by locating the laser beam focus or waist at a position midway between these two surfaces. This is pictorially illustrated in FIG. 4 as a narrowing W of the beam. In either arrangement, beam 128 can be caused to reflect back upon itself upon its reflection from shutter mirror 146, i.e., a retro-reflection, as denoted by double-arrow ray trace 128,, and used to obtain a line-of-sight or boresight reference signal. Additionally, in situations where the telescope mirrors are very highly contaminated, it is possible to clean small portions of the primary and secondary mirrors on the incoming pass prior to cleaning the entire surface on the outgoing pass. As described earlier, only small portions of the primary and secondary mirrors are covered on the incoming or initial pass in the preferred embodiment because the laser beam is only scanned through small angles equal to the telescope field of view. After all the mirrors have been cleaned, laser firing is terminated, a power-down sequence is performed, and the prism is stowed.

As previously stated, the preferred cleaning is effected as the beam exits from the telescope, using a Nd:GSGG laser source. When a carbon dioxide laser source is used, cleaning occurs as the beam enters the telescope. The divergence of the carbon dioxide laser due to diffraction requires that the optical path distance between the beam expander and the primary mirror surface be as short as possible, dictating the choice of a scanner design which enables cleaning as the beam enters the telescope. To clean the entire area of the primary and secondary mirrors within the sensor field of view in this arrangement, the laser beam injection point must not only be steered to the limits of the sensor field of view but the beams must also be translated laterally over the entire entrance aperture. The beam expander must also be refocused as the laser is scanned across the entrance pupil because the depth of focus of the laser beam is much smaller than the sag of the surface of the primary mirror. Further, the beam expander itself must move with the arm to keep it at a nearly constant distance from the primary mirror as the mechanism translates across the aperture.

The mechanical complexity and precision required to implement an incoming beam cleaning design is much greater than for a cleaning operation as the beam exits the telescope. The former clean-on the-way-in option requires a scanner having 5 degrees of freedom (x-, y-translation; x-, y-tilt; focus) and large motions to clean the mirrors, whereas the latter clean-on-the-way-out operation requires a scanner having only 3 degrees of freedom with small motions (x-, y-tilt; focus) to accomplish the same task. Thus, the latter is preferred, using the Nd:GSGG laser.

Because the laser beam safely exits the baffle tube after cleaning, no structure or baffle are exposed to the beam at any time.

Although the invention has been described with respect to particular embodiments thereof, it should be realized that various changes and modifications may be made therein without departing from the spirit and scope of the invention.

We claim:

1. In a telescope having baffles and telescope structures, an entrance aperture, a shutter and optical means positioned between the entrance aperture and the shutter, an apparatus for removing contaminants from the optical means without illumination or heating of, or damage to the baffles and telescope structures, comprising:

a reflector positioned on or adjacent to the shutter; and means for directing a laser beam through the entrance aperture from outside the telescope to said reflector, said reflector and said directing means having a cooperative opto-mechanical arrangement which enables both cleaning of the optical means and reflection of the beam on a return path back from said reflector through the entrance aperture and to the outside of the telescope without illumination or heating of, or damage to the baffles and telescope structures.

2. Apparatus in accordance with claim 1 wherein the optical means comprises primary and secondary mirrors and defines a telescope intermediate image, at which said reflector is generally positionable, and said arrangement enables the beam to be reflected from said reflector when said reflector is positioned at the intermediate image.

3. Apparatus in accordance with claim 2 in which the optical means defines a field stop in the telescope and said reflector is generally the same size as the field stop.

4. Apparatus in accordance with claim 2 in which said reflector is secured to the shutter and movable therewith into and from its position generally at the intermediate image.

5. Apparatus in accordance with claim 2 in which said beam directing means comprises a scanner positionable at the entrance aperture and functionable to direct the beam through small angles equal to the telescope field of view and thereby to translate the beam over the entire surfaces of the mirrors.

6. Apparatus in accordance with claim 5 further comprising a Nd:GSGG laser for generating the laser beam, the beam being angularly deviated by said scanner to clean the mirrors on its return path from said reflector.

7. Apparatus in accordance with claim 5 further comprising a carbon dioxide laser for generating the laser beam, the beam being translated by said scanned to clean the mirrors prior to reflection from said reflector.

8. Apparatus in accordance with claim 1, in which said opto-mechanical arrangement of said reflector and said directing means define a means for enabling retro-reflection of the beam as a line-of-sight reference signal.

9. In a telescope having baffles and telescope structures, an entrance aperture, a shutter and optical means positioned between the entrance aperture and the shutter, a method for removing contaminants from the optical means without illumination or heating of, or damage to the baffles and telescope structures, comprising the steps of:

directing a laser beam through the entrance aperture from outside the telescope to a reflector in the telescope; and organizing the reflector and the optical means into an interrelated opto-mechanical arrangement which enables both a cleaning of the optical means and a reflecting of the beam on a return path back from the reflector through the entrance aperture and to the outside of the telescope without illumination or heating of, or damage to the baffles and telescope structures.

10. A method in accordance with claim 9 wherein the optical means defines a telescope intermediate image, and said organizing step comprises the steps of enabling the reflector to be positioned generally at the intermediate image, and the beam to be reflected from the reflector when the reflector is positioned generally at the intermediate image.

11. A method in accordance with claim 10 wherein the optical means defines a field stop in the telescope, and further comprising the step of sizing the reflector to be generally the same size as the field stop.

12. A method in accordance with claim 10 in which said organizing step comprises the steps of securing the reflector to the shutter and enabling the reflector to be moved with the shutter into and from its position generally at the intermediate image.

13. A method in accordance with claim 10 in which said beam directing step comprises the step of positioning the bean at the entrance aperture and scanning the beam through small angles equal to the telescope field of view for translating the beam over the entire surfaces of the optical means on the return path.

14. A method in accordance with claim 13 further comprising the step of utilizing a Nd:GSGG laser for generating the laser beam.

15. A method in accordance with claim 14 in which said scanning step is arranged to enable the cleaning after the laser beam is reflected from the reflector.

16. A method in accordance with claim 13 further comprising the step of utilizing a carbon dioxide laser for generating the laser beam.

17. A method in accordance with claim 16 in which said scanning step is arranged to enable the cleaning before the laser beam is reflected from the reflector.

18. A method in accordance with claim 9 in which said organizing step further comprises the step of organizing the reflector and the optical means in an arrangement for enabling retro-reflection of the beam as a line-of-sight reference signal.

19. Apparatus in accordance with claim 1 in which said reflector comprises a convex mirror.

20. A method in accordance with claim 9 in which the reflector comprises a convex mirror.

* * * * *

UNITED STATES PATENT AND TRADEMARK OFFICE
CERTIFICATE OF CORRECTION

PATENT NO. : 5,068,750
DATED : November 26, 1991
INVENTOR(S) : LACY G. COOK and BRYCE A. WHEELER It is certified that error appears in the above-identified patent and that said Letters Patent is hereby corrected as shown below:

Column 4, line 54, after the word "prism" insert --132 is--
    so that the sentence reads: "...optical elements, one
    reflecting side 144b of prism 132 is...".

Column 6, line 67, change "scanned" to --scanner--.

Column 8, line 8, change "bean" to --beam--.

Signed and Sealed this

Thirteenth Day of July, 1993

Attest:

MICHAEL K. KIRK

*Attesting Officer*     *Acting Commissioner of Patents and Trademarks*